United States Patent [19]

Kurihara

[11] Patent Number: 4,981,912

[45] Date of Patent: Jan. 1, 1991

[54] SHAPED ARTICLE OF A CROSSLINKED ELASTOMER

[75] Inventor: Masakazu Kurihara, Omiya, Japan

[73] Assignee: Asahi Kasei Kogyo Kabushiki Kaisha, Osaka, Japan

[21] Appl. No.: 191,063

[22] Filed: May 6, 1988

[30] Foreign Application Priority Data

May 23, 1987 [JP] Japan ................... 62-125030
Aug. 18, 1987 [JP] Japan ................... 62-203493

[51] Int. Cl.$^5$ ............... C08C 19/00; C08C 19/22
[52] U.S. Cl. ............... 525/326.3; 525/194; 525/236; 525/377; 525/384; 525/387; 525/381; 525/382
[58] Field of Search ............ 525/326.2, 326.3, 194, 525/236

[56] References Cited

U.S. PATENT DOCUMENTS

| | | | |
|---|---|---|---|
| 1,272,040 | 7/1918 | Healy | 525/354 |
| 3,876,654 | 4/1975 | Pattison | 525/326.5 |
| 4,148,982 | 4/1979 | Morozumi | 528/481 |
| 4,358,559 | 11/1982 | Holcomb | 524/380 |
| 4,645,799 | 2/1987 | Wachi | 525/199 |

FOREIGN PATENT DOCUMENTS 1047925 10/1983 U.S.S.R. .

OTHER PUBLICATIONS

Document J5 7080-039.
Document J5 7056-237.
Document J6 1247-744-A.
Document J5 1081-437-A.

Primary Examiner—Christopher Henderson
Attorney, Agent, or Firm—Birch, Stewart, Kolasch & Birch

[57] ABSTRACT

A shaped article of a crosslinked elastomer, having a crosslink density continuously decreased from the surface toward the interior at a specific gradient, and being characterized with excellent surface non-stickiness and low friction properties, while maintaining tensile strength, elongation and compression set resistant properties as well as elastomeric properties.

7 Claims, 5 Drawing Sheets

SHAPED ARTICLE OF A CROSSLINKED ELASTOMER

BACKGROUND OF THE INVENTION

1. Field of the Invention

The present invention relates to a shaped article of a crosslinked elastomer. More particularly, the present invention is concerned with a novel shaped article comprising an elastomer which is crosslinked with at least one crosslinking agent at a crosslink density continuously decreasing from each surface toward the interior of the shaped article, so that the shaped article is not only characterized with excellent surface non-stickiness and low friction properties, but is also capable of maintaining these properties for a long period of time.

2. Discussion of Related Art

A rubber elastomer such as a natural rubber elastomer or a synthetic rubber elastomer is one of the materials which is most widely used in the fields of automobiles, industrial machines, chemical plants, etc. A rubber elastomer is usually used as the material for members which, in use, are adapted to be brought into contact with various parts of machines and devices. These members include, for example, a control valve of an intake or an exhaust system or a fuel system of an automobile, a valve for use in other machines, O-ring, a gasket, a covering for a cable and a fixing roller of a copying machine. In connection with these uses, the rubber elastomers are required to have surface nonstickiness properties.

For rendering the surface of a rubber elastomer free of stickiness and low in friction, it has been proposed to modify the surface of the rubber elastomer. For example, there have been proposed a method in which the surface of a rubber elastomer is treated with fluorine gas (Japanese Patent Application Laid-open Specification No. 57-80039), and a method in which a rubber elastomer is treated with metallic sodium in liquid ammonia (Japanese Patent Application Laid-open Specification Nos. 57-56237 and 61-247744). However, the shaped article treated by such methods have an extremely hardened surface so that cracks are likely to occur when the shaped article undergoes deformation. In addition, the shaped article is still frequently unsatisfactory in its surface non-stickiness properties even after such treatment. Further, Japanese Patent Application Laid-open Specification No. 61-81437 discloses a method in which a shaped article comprising a vulcanized fluorine-containing rubber is treated with an amine to cause a predominant dehydrofluorination reaction to occur, so that the surface of the vulcanized shaped article is resinified, thereby obtaining a vulcanized shaped article having surface non-stickiness properties. However, due to the resinification, not only are cracks likely to occur in the shaped article, but also the article becomes poor in elongation. Therefore, such a shaped article is not suitable as a sealing material.

On the other hand, there have also been proposed physical surface treatment methods such as a fluororesin coating method and a high energy-etching method in which the surface of an elastomer is decomposed and volatilized by the action of plasma. However, the high energy-etching method cannot give a shaped article having a surface which is satisfactory in surface non-stickiness and in low friction properties. On the other hand, although a fluororesin coating method yields a shaped article having a surface somewhat improved in surface non-stickiness and in low friction properties, the treated surface is likely to be peeled off when the shaped article is used for a long period of time. Further, the method is also disadvantageous in that it is expensive. Beside the above-mentioned methods, there has also been proposed a method in which a low molecular weight component contained in a rubber elastomer is extracted with a solvent such as toluene. However, by such a method, a shaped article having a surface sufficiently improved in surface non-stickiness and in low friction properties cannot be obtained.

In these situations, it has been desired to develop a shaped elastomer article which is free from the above-mentioned drawbacks that inevitably accompany the shaped elastomer articles which have been treated by the above conventional methods.

SUMMARY OF THE INVENTION

The present inventor has made extensive and intensive studies with a view toward developing a shaped elastomer article which is not only satisfactory in physical properties such as tensile strength, elongation and compression set resistance but is also excellent in surface properties such as surface non-stickiness and low friction properties. As a result, it has been found that when the surface of a shaped article of an elastomer crosslinked uniformly with at least one first crosslinking agent throughout the article is treated with at least one second crosslinking agent, there is obtained a shaped elastomer article which is crosslinked with the first crosslinking agent at a substantially uniform first partial crosslink density throughout the entire body of the shaped article and additionally crosslinked with the second crosslinking agent at a second partial crosslink density continuously decreasing from the surface toward the interior, thereby providing a total crosslink density which is constituted of the above-mentioned first and second partial crosslink densities and continuously decreases from the surface toward the interior of the shaped article. Such a shaped elastomer article having the above-mentioned unique crosslink density distribution is excellent not only in physical properties but also in surface properties. The present invention has been completed on the basis of these novel findings.

It is, therefore, one of the objects and a principal object of the present invention to provide a shaped elastomer article which has excellent surface non-stickiness and low friction properties, substantially without the sacrifice of any of the elastomeric properties and which is capable of stably maintaining these excellent surface properties for a long period of time.

The foregoing and other objects, features and advantages of the present invention will be apparent from the following detailed description and appended claims taken in connection with the accompanying drawings.

DETAILED DESCRIPTION OF THE INVENTION

According to the present invention, there is provided a shaped article comprising a crosslinked elastomer, said shaped article being crosslinked with at least one first crosslinking agent at a substantially uniform first partial crosslink density throughout said shaped article and crosslinked with at least one second crosslinking agent at a second partial crosslink density continuously decreasing from each surface of the shaped article toward the interior of the shaped article, said first crosslinking agent being the same as or different from said second crosslinking agent, said first partial crosslink density cooperating with said second partial crosslink density to provide a total crosslink density continuously decreasing from each surface of the shaped article toward the interior of the shaped article, said total crosslink density reaching a minimum at a depth of greater than 5 μm from said surface, the ratio of the total crosslink density at said surface relative to the minimum total crosslink density being 1.5 to 25.

The crosslinked elastomer shaped article of the present invention is prepared by blending an elastomer with at least one first crosslinking agent and subjecting the resultant blend to molding to thereby obtain a shaped article which is crosslinked with the first crosslinking agent at a first partial crosslink density substantially uniform throughout the shaped article, and subsequently treating the surface of the thus obtained shaped article with at least one second crosslinking agent to modify the surface of the shaped article, thus obtaining an ultimate shaped article of the present invention which is additionally crosslinked with the second crosslinking agent at a second partial crosslink density continuously decreasing from the surface toward the interior to thereby provide a total crosslink density which is constituted of the above-mentioned first and second partial crosslink densities and continuously decreases from the surface toward the interior of the shaped article. In the above procedure, as described later, the shaped article having the first partial crosslink density substantially uniform through the shaped article, which is subsequently to be treated for modification of the surface, may be either one which has been subjected to only the so-called primary vulcanization, or one which has further been subjected to secondary vulcanization or oven vulcanization after the primary vulcanization.

In the present invention, the first crosslinking for uniformly crosslinking an elastomer is generally known as vulcanization and, therefore, hereinafter often referred to as "vulcanization". The second crosslinking for modification of the surface of the uniformly crosslinked shaped article is hereinafter often referred to simply as "crosslinking". The crosslinking agent for the "vulcanization" and the crosslinking agent for the "crosslinking", which may be the same or different, are hereinafter often referred to as "vulcanizing agent" and "crosslinking agent", respectively. The total crosslink density in the ultimate shaped article of the present invention is a total of the first partial crosslink density due to the vulcanization and the second partial crosslink density due to the crosslinking, and can be measured by infrared spectrophotometry as described later.

The vulcanized elastomer shaped articles to be subjected to treatment with a crosslinking agent for modifying the surface thereof may be those which are known. Such shaped articles comprising a vulcanized elastomer are prepared, for example, by blending 100 parts by weight of an elastomer with from 0.3 to 5 parts by weight of a vulcanizing agent, from 0 to 3 parts by weight of a vulcanization accelerator, and from 0 to 5 parts by weight of a vulcanization promoter, and, if desired, up to 100 parts by weight of carbon black to 30 parts by weight of a metal oxide, up to 15 parts by weight of a metal hydroxide, up to 3 parts by weight of an antioxidant, up to 3 parts by weight of, a scorch retarder, up to 10 parts by weight of a plasticizer and the like, and a subjecting the resultant blend to molding. Representative examples of elastomers include natural rubber, a polybutadiene rubber, a styrene-butadiene copolymer, a polychloroprene rubber, an ethylenepropylene copolymer, an ethylene-propylene-diene terpolymer, an acrylonitrile-butadiene copolymer, a polyisoprene rubber, an isobutylene-isoprene copolymer, a chlorinated polyethylene rubber, a chlorosulfonated polyethylene rubber, a silicone rubber, a urethane rubber, an acrylic rubber, a polyisobutylene rubber, a fluorine-containing rubber, a fluorosilicone rubber, and blends thereof. Of these elastomers, a fluorine-containing rubber is especially preferred. Since up to the present time, there are no methods for imparting satisfactory surface non-stickiness properties to the surface of a fluorine-containing rubber, the development of an effective method for imparting excellent surface non-stickiness properties to the surface of a fluorine-containing rubber is desired. Representative examples of fluorine-containing rubbers include a vinylidene fluoride-hexafluoropropylene copolymer, a vinylidene fluoride-hexafluoropropylene-tetrafluoroethylene terpolymer, and the above-mentioned polymers which further contain bromine or iodine. A fluoroether copolymer is also included among the above example.

The vulcanizing agent (first crosslinking agent) may be appropriately selected according to the mode of vulcanization. For example, in sulfur vulcanization, not only sulfur, but also a sulfide compound such as morpholine disulfide, alkylphenol disulfide, N,N'-dithiobis(-hexahydro-2H-azepione-2) and a phosphorus-containing polysulfide can be used as a vulcanizing agent. Oxime vulcanization and quinone vulcanization are usually effective for vulcanization of a butyl rubber or polysulfide rubber. Representative examples of oxime vulcanizing agents and quinone vulcanizing agents include p,p'-dibenzoylquinone dioxime and tetrachloro-p-benzoquinone. Polyamine vulcanizing agents are usually used for the vulcanization of a fluorine-containing rubber, an acrylic rubber and a chlorinated polyethylene rubber. Representative examples of polyamine vulcanizing agents include hexamethylenediamine, hexamethylenediamine carbamate, triethylenetetramine and ethylenediamine carbamate. Peroxide vulcanizing agents are usually used for vulcanization of a diene type rubber or a fluorine-containing rubber. Representative examples of peroxide vulcanizing agents include dicumyl peroxide, 2,5-dimethyl-2,5-di(t-butyl peroxy)hexane and benzoyl peroxide. These peroxide vulcanizing agents may be used in combination with a monomer such as triallyl isocyanurate, a polyfunctional methacrylate or N,N'-m-phenylenedimaleimide. Polyhydroxy vulcanizing agents and Schiff base-modified polyamine vulcanizing agents containing 2 or 3 Schiff bases in the molecule are usually used for vulcanization of a fluorine-containing rubber. Representative examples of polyhydroxy vulcanizing agents include bisphenol A, hydroquinone and bisphenol AF. Representative examples of Schiff base-modified polyamine vulcanizing agents include N,N'-dicinnamylidene-1,6-hexanediamine and N,N'-dicinnamylidene-1,2-ethanediamine.

Examples of vulcanization accelerators useful in vulcanizing a diene rubber include those of a guanidine type, a thiuram type, a thiazol type, an aldehyde-amine type and a dithiocarbamate type. Representative examples of these types of vulcanization accelerators respectively include diphenylguanidine, tetramethylthiuram monosulfide, 2-mercaptobenzothiazole, acetaldehyde ammonia and sodium dimethyl dithiocarbamate. In vulcanization of a fluorine-containing rubber with a polyhydroxy vulcanizing agent, a vulcanization accelerator selected from a quaternary-ammonium halide, an organophosphonium halide and a bis(organophosphine)iminium, may optionally be employed. Representative examples of these vulcanization accelerators respectively include 8-benzyl-1,8-diazabicyclo[5,4,0]-7-undecenium chloride, benzyltriphenylphosphonium chloride and bis(benzyldiphenylphosphine)iminium chloride.

If desired, vulcanization promoters, which are capable of promoting the activities of the vulcanization accelerators, may also be employed. Such promotors include, for example, metal oxides such as zinc oxide and magnesium oxide, and stearic acid. Particularly, in vulcanization of a fluorine-containing rubber, sulfone compounds such as dimethyl sulfone and p,p'-dichlorophenylsulfone and sulfoxide compounds such as dimethyl sulfoxide may also be used as vulcanization promotors.

As described above, the shaped article of a vulcanized elastomer is crosslinked with the vulcanizing agent (i.e. first crosslinking agent) to provide a first partial crosslink density which is substantially uniform throughout the shaped article.

The surface of the shaped article of a vulcanized elastomer is then treated with a second crosslinking agent (herein often referred to simply as "crosslinking agent") to modify the surface portion of the shaped article. By such modification of the surface portion of the vulcanized elastomer shaped article, the surface portion is further crosslinked to thereby provide a second partial crosslink density at least at the surface portion of the shaped article. The second partial crosslink density decreases continuously from the surface toward the interior of the shaped article. The second partial crosslink density produced by the crosslinking with the crosslinking agent (i.e., second crosslinking agent) provides a total crosslink density in cooperation with the first partial crosslink density produced by the crosslinking with the vulcanizing agent(i.e., first crosslinking). The total crosslink density in the ultimate shaped article decreases continuously from the surface toward the interior of the shaped article the decrease in the total crosslink density being in correspondence with the decrease in the second partial crosslink density because the first partial crosslink density produced by the vulcanization with the first crosslinking agent (i.e., first crosslinking) is substantially uniform throughout the entire body of the shaped article. Therefore, the type of the second crosslinking agent and the variation of the second partial crosslink density from the surface toward the interior of the shaped article can be determined by examining the infrared spectrum taken with respect to the ultimate shaped article of the present invention, even though the first and second crosslinking agents can be detected only as a total of them in the infrared spectrum (see FIGS. 1, 2, 3 and 4)and the first and second partial crosslink densities can also be detected only as a total of the two densities, i.e., only in the form of a total crosslink density (see FIG. 5).

With respect to the "continuous decrease" feature of the total crosslink density in the shaped article of the present invention, an explanation will be given hereunder. In the following explanation, the total crosslink density is referred to simply as "crosslink density".

As described above, the shaped article of the present invention has a crosslink density continuously decreased from each surface of the shaped article toward the interior of the shaped article. The crosslink density continuously decreases and reaches a minimum at a depth of greater than 5 $\mu$m from the surface. In the shaped article, the ratio of the crosslink density at the surface to the minimum crosslink density is from 1.5 to 25, preferably from 5 to 15. When the crosslink density ratio is less than 1.5, the surface non-stickiness properties of the shaped article would be insufficient. On the other hand, when the crosslink density ratio is more than 25, the surface of a shaped article would be so hardened that the shaped article becomes extremely poor in elongation, and as a result, the elastomeric properties of the shaped article are likely to be impaired. Further, the ratio of the crosslink density at a depth of 50 $\mu$m from the surface to the minimum crosslink density is preferably 2 or less. When the ratio exceeds 2, a shaped article is likely to be poor in elongation. In other words, it is preferable that the depth at which the crosslink density becomes two times as high as the minimum crosslink density is not greater than 50 $\mu$m from the surface.

In the present invention, the gradient of the continuous decrease of the crosslink density is more preferably such that the crosslink density at a depth of 1 $\mu$m from the surface satisfies the following equation:

$$\frac{C_1 - C_i}{C_s - C_i} = t$$

wherein $C_1$ is the crosslink density at a depth of 1 $\mu$m from the surface, $C_s$ is the crosslink density at the surface, $C_i$ is the minimum crosslink density in the interior and t is from 0.3 to 0.9.

In other words, it is preferable that the ratio of the second partial crosslink density at a depth of 1 $\mu$m from the surface to the second partial crosslink density at the surface be within a range such that t in the above equation is from 0.3 to 0.9.

When the gradient of the decrease of the crosslink density is too gradual, an extremely hardened shaped article is likely to result, thereby leading to a decrease in elongation of the shaped article. On the other hand, when the decrease of the crosslink density is too steep, the thickness of a surface portion having a high crosslink density is considerably small, so that the internal portion having a low crosslink density would be exposed on the surface with time, thereby leading to a poor surface non-stickiness properties. With respect to the depth from the surface, at which the crosslinking density reaches the minimum, there is no particular restriction. However, the depth from the surface is preferably 40% or less of the entire thickness of the shaped article. As described, it is necessary that the crosslink density continuously decreases from each surface of the shaped article toward the interior of the shaped article. If the decrease of the crosslink density is not continuous, i.e., if the crosslink density suddenly decreases from a portion to the adjacent portion, the concentration of stress is likely to occur at the boundary of the sudden change of crosslink density when tensile force is applied to the shaped article, so that cracking and peeling off of the surface portion are likely to occur. Further, in such a case, the elongation of the shaped article becomes extremely poor.

With respect to the hardness of the surface portion of the shaped article of the present invention, there is no particular restriction. However, the hardness is preferably within the range of from 50 to 95 in terms of JIS A hardness. When the hardness is too low, the shaped article is insufficient in surface non-stickiness properties. On the other hand, when the hardness is too high, the shaped article is poor in sealing properties and in elongation, and also is undesirably brittle.

The crosslinked elastomer shaped article of the present invention is not only free from peeling off of the surface portion and occurrence of cracking by tensile stress but also excellent in elastomeric properties, and yet exhibits excellent surface non-stickiness and low friction properties, substantially without the sacrifice of the tensile strength, elongation and compression set resistant properties of the shaped article.

The treatment of the surface of the shaped article of a vulcanized elastomer with at least one crosslinking agent(second crosslinking agent) may be performed as follows. The vulcanized elastomer shaped article is immersed in a treating solution of a crosslinking agent and, if desired, a crosslinking accelerator and a crosslinking promoter in an organic solvent to impregnate at least the surface portion of the shaped article with the above-mentioned ingredients for crosslinking dissolved in the solvent. The shaped article is taken out of the solution and dried, followed by heating for crosslinking.

The types of the crosslinking agents to be used for modifying the surface of the vulcanized elastomer shaped article may be the same as or different from those of the vulcanization agents, as long as the crosslinking agents are capable of forming a crosslinked structure in the shaped article.

The crosslinking agent(second crosslinking agent) may be appropriately selected according to the mode of crosslinking. For example, in sulfur crosslinking, not only sulfur, but also a sulfide compound such as morpholine disulfide, alkylphenol disulfide, N,N'-dithiobis(-hexahydro-2H-azepione-2) and a phosphorus-containing polysulfide can be used as a crosslinking agent. Oxime crosslinking and quinone crosslinking are usually effective for crosslinking a butyl rubber or polysulfide rubber. Representative examples of oxime crosslinking agents and quinone crosslinking agents include p,p'-dibenzoylquinone dioxime and tetrachloro-p-benzoquinone. Peroxide crosslinking agents are usually used for crosslinking a diene type rubber or a fluorine-containing rubber. Representative examples of peroxide crosslinking agents include dicumyl peroxide, 2,5-dimethyl-2,5-di(t-butyl peroxy) hexane and benzoyl peroxide. These peroxide crosslinking agents may be used in combination with a monomer such as triallyl isocyanurate, a polyfunctional methacrylate or N,N'-m-phenylenedimaleimide. Polyhydroxy crosslinking agents and Schiff base-modified polyamine crosslinking agents containing 2 or 3 Schiff bases in the molecule are usually used for vulcanization of a fluorine-containing rubber. Representative examples of polyhydroxy crosslinking agents include bisphenol A, hydroquinone and bisphenol AF. Representative examples of Schiff base-modified polyamine crosslinking agents include N,N'-dicinnamylidene-1,6-hexanediamine and N,N'-dicinnamylidene-1,2-ethanediamine. As opposed to non-modified polyamines, these Schiff base-modified polyamine crosslinking agents containing 2 or 3 Schiff bases have a very low basicity and, hence, do not act until the temperature of the reaction system is elevated to high temperatures. This prevents the occurrence of not only resinification of the shaped article due to the dehydrofluorination reaction, but also cracking.

Examples of crosslinking accelerators include those of a guanidine type, a thiuram type, a thiazol type, an aldehyde-amine type and a dithiocarbamate type. Representative examples of these types of crosslinking accelerators respectively include diphenylguanidine, tetramethylthiuram monosulfide, 2-mercaptobenzothiazole, acetaldehyde ammonia and sodium dimethyl dithiocarbamate. In crosslinking a fluorine-containing rubber with a polyhydroxy crosslinking agent, a crosslinking accelerator selected from a quaternary ammonium halide, an organophosphonium halide and a bis(organophosphine)iminium may optionally be employed. Representative examples of these crosslinking accelerators respectively include 8-benzyl-1,8-diazabicyclo[5,4,0]-7-undecenium chloride, benzyltriphenylphosphonium chloride and bis(benzylphenylphosphine)iminium chloride.

If desired, crosslinking promoters, which are capable of promoting the activities of the crosslinking accelerators, may also be employed. Such promotors include, for example, metal oxides such as zinc oxide and magnesium oxide, and stearic acid. Particularly, in crosslinking a fluorine-containing rubber, sulfone compounds such as dimethyl sulfone and p,p'-dichlorophenylsulfone and sulfoxide compounds such as dimethyl sulfoxide may also be used as crosslinking promotors.

In the present invention, there is no particular restriction with respect to the type of an organic solvent for preparing a treating solution to be used for modifying the surface of the shaped article. There is also no particular restriction with respect to the temperature and time to be employed for immersion of the shaped article in the treating solution. However, it is preferred that the organic solvent be capable of swelling the shaped article so that the crosslinking agent, the crosslinking accelerator, etc. can easily penetrate into the shaped article. Representative examples of organic solvents include hydrocarbons such as benzene and hexane, alcohols such as methanol and ethanol, ketones such as acetone and methyl ethyl ketone, esters such as ethyl acetate, carbon disulfide, and mixtures thereof. In a treating solution, the crosslinking agent concentration is generally from 1 to 50% by weight. The crosslinking accelerator concentration is generally from 0.1 to 20% by weight and the crosslinking promotor concentration is generally from 0 to 20% by weight. The temperature of immersion is preferably in the range of from 0° to 180° C. The time of immersion is appropriately selected within the range of from about 5 second to about 48 hours. When the concentrations of the crosslinking agent, the crosslinking accelerator and the like in the treating solution are too high and the time of immersion is too long, the crosslink density in the surface of the shaped article becomes too high. When the temperature of immersion is too high and the time of immersion is too long, the gradient of the decrease of the crosslink density becomes too gradual, resulting in an ultimate shaped article having too high a hardness. Therefore, it is necessary to select appropriate immersion conditions such as concentrations of the ingredients in the treating solution, and temperature and time of immersion.

After the immersion, the shaped article is taken out of the treating solution and dried. The dried shaped article is then heated for crosslinking. The heating temperature and time are not particularly limited. However, according to the types of a rubber elastomer, a crosslinking agent, a crosslinking accelerator and the like, the heating temperature and time are appropriately selected. By heating the shaped article impregnated with the crosslinking agent, the second crosslinking occurs in the shaped article and, at the same time, the unreacted crosslinking agent, etc. are volatilized and then decomposed and/or decomposed and then volatilized. The crosslinking temperature is appropriately selected within the range of from 100° to 280° C., and the crosslinking time is appropriately selected within the range of from 10 minutes to 24 hours. Under these crosslinking conditions, the shaped article may further be subjected to the socalled secondary vulcanization or oven vulcanization.

The crosslinked elastomer shaped article of the present invention is imparted with excellent surface non-stickiness and low friction properties, substantially without the sacrifice of the elastomeric properties. Therefore, the shaped article of the present invention can advantageously be used in various fields where not only elastomeric properties but also excellent surface non-stickiness and low friction properties are required, for example, it can advantageously be used as a control valve, an oil seal, a diaphragm, a gasket, an O-ring, a blade, a covering for a cable, a heat fixing roller of a copying machine, etc., the heat fixing roller being required to have tonor offset-preventive properties.

DETAILED DESCRIPTION OF PREFERRED EMBODIMENTS

The present invention will now be described in more detail with reference to the following Examples and Comparative Examples, which should not be construed as limiting the scope of the present invention.

In Examples and Comparative Examples, the stickiness, crosslink density (total crosslink density) and other properties are measured in accordance with the following methods. Before the measurement, each of the shaped articles obtained in Examples and Comparative Examples is cleaned with an organic solvent capable of dissolving the crosslinking agent etc., such as a ketone, a hydrocarbon, an alcohol or the like, to completely remove any remaining crosslinking agent etc.

(1) Stickiness

A sample rubber sheet [2.0 mm(thickness)×35 mm×35 mm] is attached onto the upper surface of a flat stand using a heat resistant double side adhesive tape and, thereon, is placed a steel (JIS S-45C) ring having a flat bottom which ring is provided with a weight-receiving portion and a hanging means so that the flat bottom contacts the rubber sheet (the ring is 25 mm in outer diameter and 19 mm in inner diameter, and the flat bottom thereof in contact with the rubber sheet has previously been abraded with 1000 abrasive paper). Subsequently, a weight is placed on the weight-receiving portion of the ring so that the total load on the rubber sheet becomes 609 g/cm$^2$. The whole is heated in an oven at 120° C. for 20 hours, and then taken out and allowed to stand to cool for about 4 hours. When the temperature descends to 23° C., the weight is removed. Then, the ring sticking to the rubber sheet is connected, by means of the hanging means, to a tensile machine having a load cell, and pulled at a pulling rate of 50 mm/min to measure the sticking strength.

(2) Crosslink density

The infrared absorption spectrum of the surface of each sample is obtained by the attenuated total reflectance (ATR) method, using a Fourier transform infrared spectrometer JIR-100 manufactured and sold by JEOL, Japan. In the infrared absorption spectrum, the height of the peak ascribed to the crosslinking agent ($h_1$) and the height of the peak ascribed to the elastomer ($h_2$) are measured, and the ratio of $h_1$ to $h_2$, i.e., $h_1/h_2$ is obtained. The $h_1/h_2$ ratio is in proportion to the crosslink density of the surface of the sample. When two or more crosslinking agents are used, the $h_1/h_2$ ratio due to each crosslinking agent is separately obtained and summed up. In the present invention, the crosslink density ratio is always used for evaluating the crosslink density distribution and, hence, the crosslink density can be represented by the $h_1/h_2$ ratio.

With respect to the crosslink density at a predetermined depth from the surface, the sample is abraded to expose the surface at the depth and then the measurement of the crosslink density by infrared spectrophotometry is done. For the measurements of the crosslink density at a depth in the range of several microns or less from the surface, the crosslink density at a depth in the range of from several microns to several tens microns from the surface, and the crosslink density at a depth in the range of from several tens microns to several hundreds microns from the surface, 1000, 500 and 250 abrasive papers (JIS R6001) are respectively used for abrasion. The abrasion depth is determined by dividing the weight of a portion abraded by the specific gravity of the sample. Incidentally, the surface infrared spectrum can detect the crosslink density in a layer having a thickness up to 0.5 μm.

(3) Other physical properties

The hardness, tensile strength and elongation of each sample are measured by a method according to JIS K6301. The compression set of each sample is measured under the conditions described at footnote (5) of Table 1 given later.

EXAMPLES 1 to 5

Each of formulations as indicated in Table 1 is separately kneaded by means of 6-inch mixing rolls, and subjected to press-molding and vulcanized at 177° C. for 10 minutes to prepare a vulcanized sheet having a size of 90 mm×160 mm×2 mm.

Separately, each of treating solutions having compositions as indicated in Table 1, i.e., an acetone solution containing bisphenol AF alone or containing bisphenol AF and a crosslinking accelerator, is prepared. In each treating solution is separately immersed each of the above-prepared sheets under conditions as indicated in Table 1. The sheet is taken out of the treating solution, air-dried overnight, and subsequently dried at 120° C. for 30 minutes. Then, the sheet is placed in an oven and crosslinked at 232° C. for 24 hours. With respect to the thus obtained sheets, the physical properties are measured. The results are shown in Table 1.

COMPARATIVE EXAMPLES 1 to 3

Substantially the same procedures as described in Examples 1 to 5 are repeated except that the formulations as indicated in Table 1 are employed and the treatments for surface modification is omitted. The results are shown in Table 1.

Figure 1:
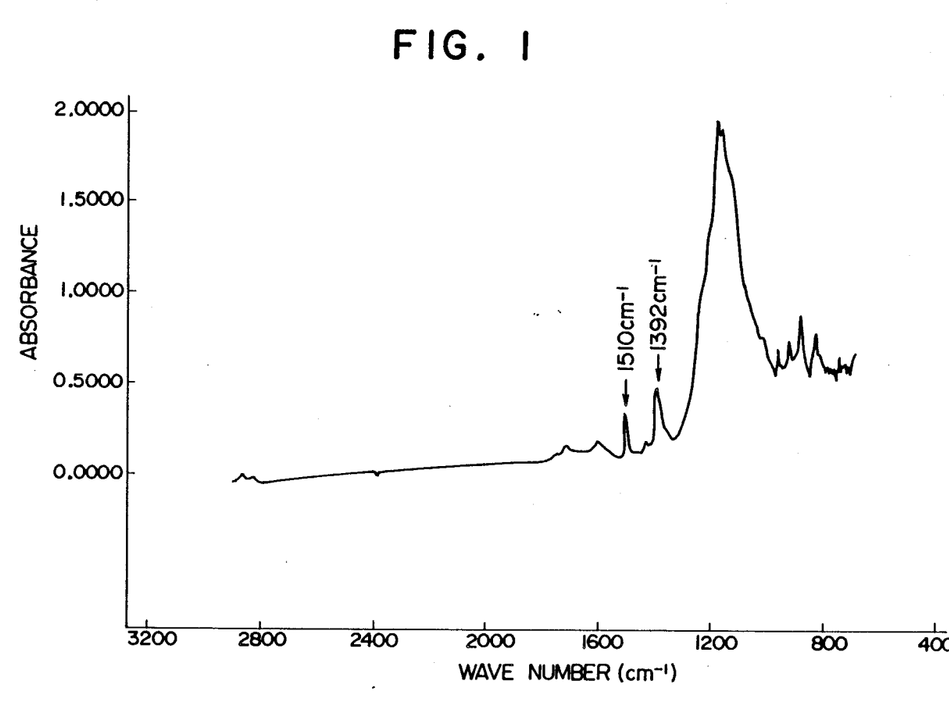
FIG. 1 is an infrared spectrum of one form a shaped article of the present invention, with a peak at 1392 cm$^{-1}$ ascribed to the elastomer component and a peak at 1510 cm$^{-1}$ ascribed to the bisphenol A which has been used as the first and second crosslinking agents for providing a total crosslink density decreasing from the surface toward the interior.
Figure 2:
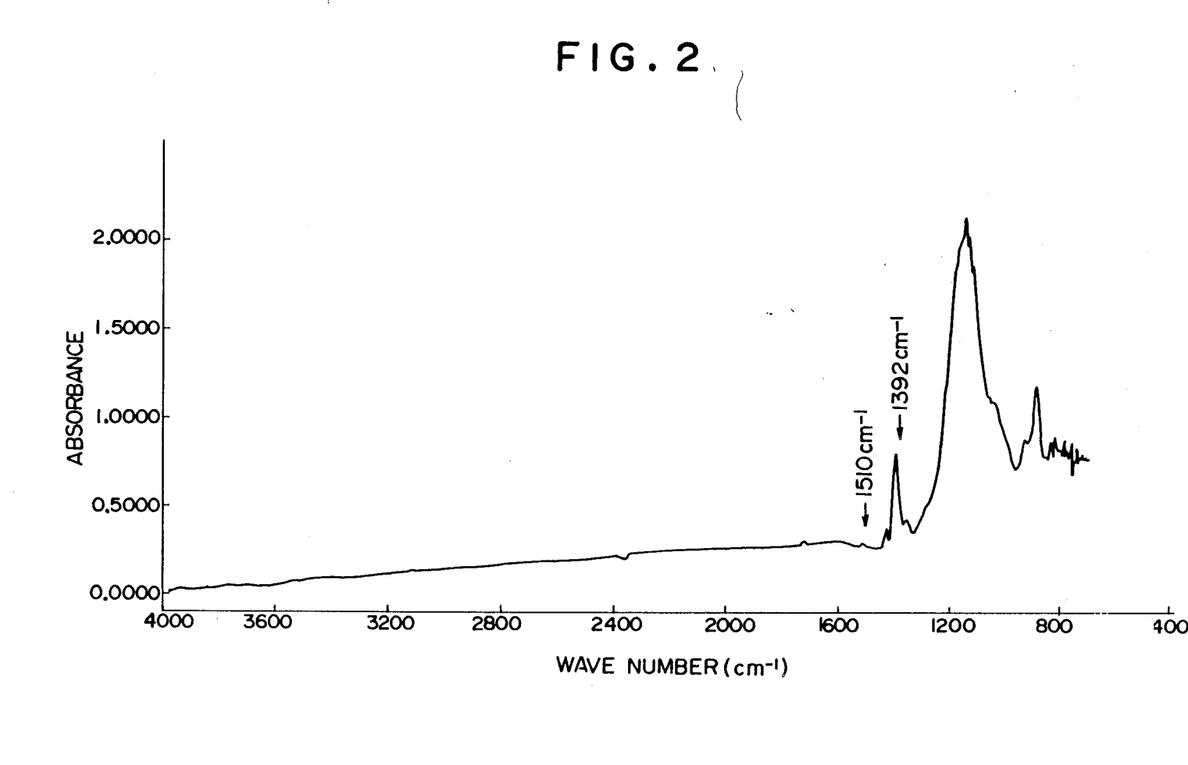
FIG. 2 is an infrared spectrum of a comparative shaped article of an elastomer, with a peak at 1392 cm$^{-1}$ ascribed to the elastomer component and a small peak at 1510 cm$^{-1}$ ascribed to the bisphenol A which has been used as a first crosslinking agent to provide only a first partial crosslink density substantially uniform throughout the shaped article.
Figure 3:
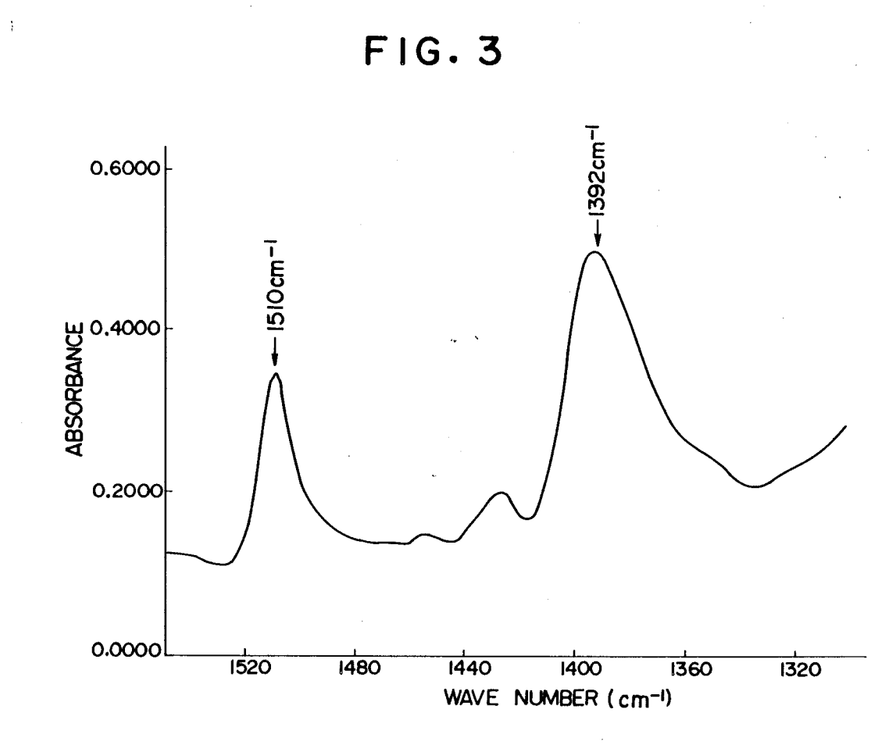
FIG. 3 is an enlarged view of FIG. 1.
Figure 4:
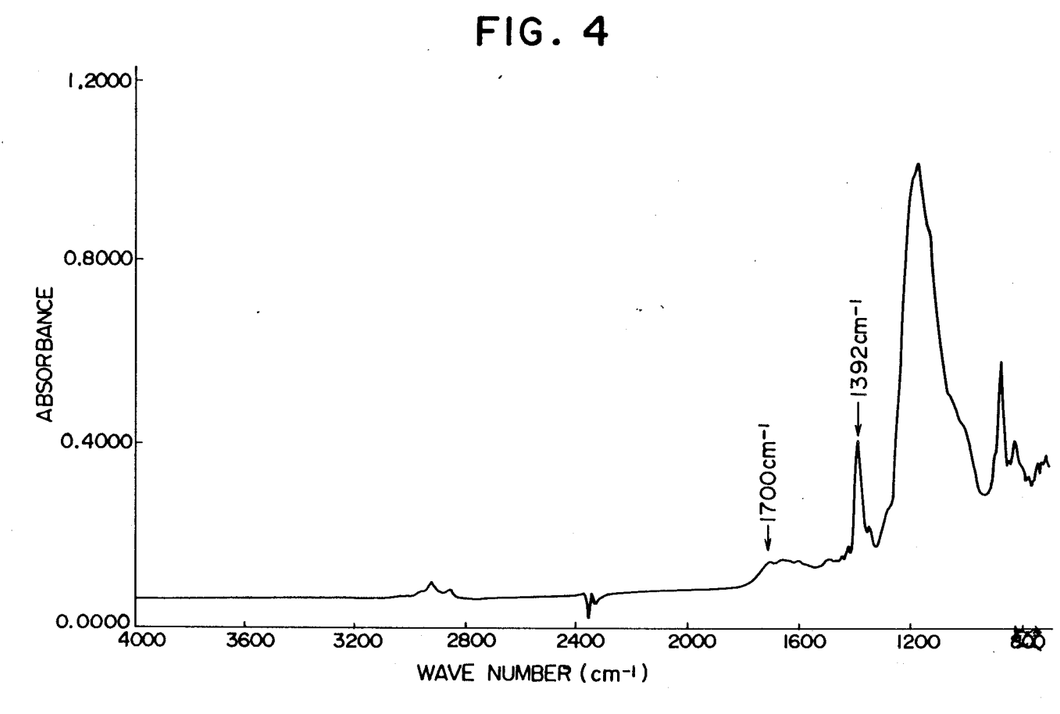
FIG. 4 is an infrared spectrum of another form of a shaped article of the present invention, with a peak at 1392 cm$^{-1}$ ascribed to the elastomer component and a peak at 1700 cm$^{-1}$ ascribed to the N,N'-dicinnamylidene-1,6-hexanediamine which has been used as the first and second crosslinking agents for providing a total crosslink density decreasing from the surface toward the interior.
Figure 5:
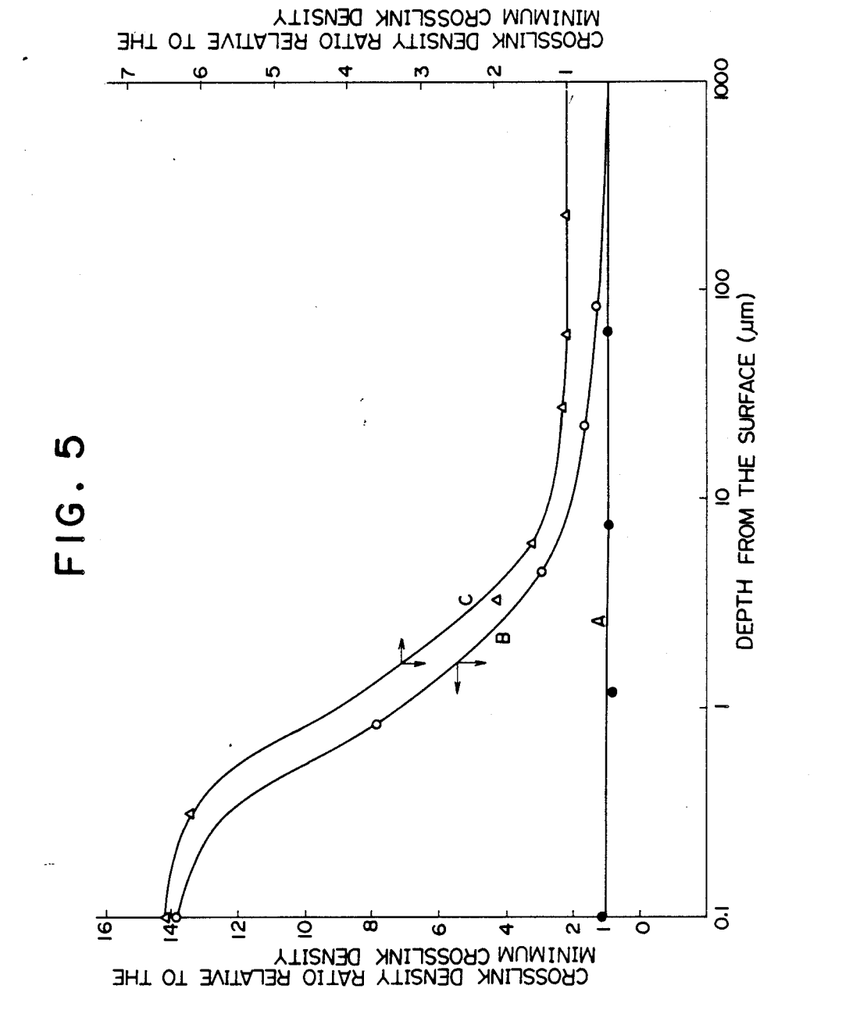
FIG. 5 is a graph showing the relationships between the depth from the surface and the ratio of the total crosslink density to the minimum total crosslink density, in which the relationships are shown with respect to the shaped articles obtained in Example 2 (curve B), Example 3 (curve C) and Comparative Example 1 (line A).

C indicates the curve obtained with respect to the article of Example 3.

It will be understood from FIG. 5 that with respect to the surface-treated shaped article of Example 2, the total crosslink density at the surface is as high as about 14 times the minimum total crosslink density at the interior, that the total crosslink density continuously decreases from the surface toward the interior sharply, and that the depth from the surface at which the total crosslink density reaches the minimum is extremely small.

The shaped article obtained in Example 3 (represented by the curve C of FIG. 5) represents a special case in which the total crosslink density at even the central portion of the shaped article has become larger than that before the surface treatment. The shaped article is accompanied by an increase in hardness, exhibiting some decrease in tensile strength and elongation. However, no cracks are observed and the shaped article has remarkably improved surface non-stickiness properties.

In FIG. 5, the difference between the curve C and the line A with respect to the total crosslink density ratio relative to the minimum crosslink density means the increase in the total crosslink density ratio after the surface treatment relative to that before the surface treatment.

TABLE 1

| | | Example | | | | | Comparative Example | | |
|---|---|---|---|---|---|---|---|---|---|
| | | 1 | 2 | 3 | 4 | 5 | 1 | 2 | 3 |
| Formulation (parts by weight) | Polymer A[1] | 100 | 100 | 100 | 100 | — | 100 | 100 | — |
| | Viton E-60[2] | — | — | — | — | 100 | — | — | 100 |
| | MT Carbon Black | 30 | 30 | 30 | 30 | 30 | 30 | 30 | 30 |
| | Ca(OH)$_2$ | 6 | 6 | 6 | 6 | 6 | 6 | 6 | 6 |
| | MgO (high activity) | 3 | 3 | 3 | 3 | 3 | 3 | 3 | 3 |
| | Bisphenol AF | 2 | 2 | 2 | 2 | 2 | 2 | 3 | 2 |
| | BDPIC[3] | 0.3 | 0.3 | 0.3 | 0.3 | 0.3 | 0.3 | 0.3 | 0.3 |
| | Dimethylsulfone | 2 | 2 | 2 | 2 | 2 | 2 | 2 | 2 |
| Vulcanizing reaction (°C. × min) | | 177 × 10 | 177 × 10 | 177 × 10 | 177 × 10 | 177 × 10 | 177 × 10 | 177 × 10 | 177 × 10 |
| Treating conditions | Bisphenol AF (wt %) | 33 | 10 | 10 | 10 | 10 | — | — | — |
| | BDPIC[3] (wt %) | — | 2 | 2 | — | 2 | — | — | — |
| | BTPPC[4] (wt %) | — | — | — | 2 | — | — | — | — |
| | Solvent | acetone | acetone | acetone | acetone | acetone | — | — | — |
| | Immersion temp. (°C.) | 20 | 20 | 20 | 20 | 20 | — | — | — |
| | Immersion time (min) | 240 | 15 | 240 | 15 | 15 | — | — | — |
| | Crosslinking reaction (°C. × hr) | 232 × 24 | 232 × 24 | 232 × 24 | 232 × 24 | 232 × 24 | 232 × 24 | 232 × 24 | 232 × 24 |
| Physical properties | Hardness (JIS A) | 87 | 82 | 90 | 81 | 81 | 77 | 83 | 78 |
| | Tensile strength (kg/cm$^2$) | 125 | 180 | 110 | 170 | 140 | 185 | 180 | 155 |
| | Elongation (%) | 130 | 185 | 120 | 185 | 160 | 240 | 175 | 200 |
| | Compression set (%)[5] | 25 | 18 | 27 | 20 | 23 | 18 | 17 | 21 |
| | Surface stickiness (Kgf) | 1.3 | 0.5 | 0 | 0.5 | 1.5 | 23 | 15 | 35 |

Note:
[1]consisting of vinylidene fluoride/hexafluoropropylene/tetrafluoroethylene (69/13/18 in molar ratio) and having an intrinsic viscosity index of 200 ml/g (solvent: methyl ethyl ketone, temperature: 35° C.)
[2]consisting of vinylidene fluoride/hexafluoropropylene (80/20 in molar ratio) (manufactured and sold by E. I. Du Pont De Nemours And Company, U.S.A.)
[3]Bis(benzyldiphenylphosphine)iminium chloride
[4]Benzyltriphenylphosphonium chloride
[5]as measured by using an O-ring (P-24) under 25% compression at 200° C. for 72 hr.

All of the shaped articles obtained in Examples 1 to 5 have excellent surface non-stickiness properties, and no cracks are observed on the surfaces of all the articles. With respect to the surface-treated shaped articles obtained in Examples 2 and 3 and the control shaped article obtained in Comparative Example 1, the total crosslink density ratios relative to the minimum total crosslink density are measured at different depths from the surface of each of the articles according to the method described hereinbefore. The results are shown in the graph of FIG. 5. In FIG. 5, character A indicates the line obtained with respect to the article of Comparative Example 1, character B indicates the curve obtained with respect to the article of Example 2, and character C indicates the curve obtained with respect to the article of Example 3.

With respect to each of the shaped articles of Example 2 and Comparative Example 1, the friction coefficient is measured. The shaped article of Comparative Example 1 has a static friction coefficient of 2.55 and a dynamic friction coefficient of 1.29. In contrast, the shaped article of Example 2 has a static friction coefficient of 0.52 and a dynamic friction coefficient of 0.78. The friction coefficient is measured in accordance with ASTM D 1894, method (b). In the measurement, the stretching rate is 150 mm/min and the thread weight is 230 g.

Due to the high total crosslink density at the surfaces of the article and the increased hardness of the surface of the article, the shaped article of the present invention has improved surface nonstickiness and low friction properties. Moreover, due to the continuous decrease in total crosslink density from the surface to the interior and to the extremely small depth of a crosslinked portion within the article, the shaped article of the present invention has an excellent elasticity, and is free of not only the danger of occurrence of cracking at the time when tensile force is applied, but is also free of the problem of decrease in tensile strength, elongation, and compression set resistant properties.

From the results of Example 2 and Comparative Example 2, it will be understood that the improvements in surface non-stickiness and low friction properties which are attained by the present invention are not simply due to an increase in hardness, and that the effect of the present invention is surprising.

EXAMPLES 6 and 7

Substantially the same procedures as described in Examples 1 to 5 are repeated, except that the formulations, crosslinking reaction (heat pressmolding) conditions and surface-treating conditions indicated in Table 2 are employed. The results are also shown in Table 2.

COMPARATIVE EXAMPLES 4 and 5

Substantially the same procedures as described in Examples 6 and 7 are repeated except that the formulations indicated in Table 2 are employed and the surface treatment is omitted. The results are shown in Table 2.

EXAMPLES 8 to 10

Substantially the same procedures as described in Examples 1 to 5 are repeated, except that the formulations and surface-treating conditions indicated in Table 3 are employed. The results are shown in Table 3.

TABLE 3

|  |  | Example | | |
|---|---|---|---|---|
|  |  | 8 | 9 | 10 |
| Formulation (parts by weight) | Polymer A[1] | 100 | 100 | 100 |
|  | MT Carbon Black | 30 | 30 | 10 |
|  | Ca(OH)$_2$ | 6 | 6 | 6 |
|  | MgO (high activity) | 3 | 3 | 3 |
|  | Bisphenol AF | 2 | 2 | 2 |
|  | BDPIC[2] | 0.3 | 0.3 | 0.3 |
|  | Dimethylsulfone | 2 | 2 | 2 |
| Vulcanizing reaction |  | 177° C. 10 min | 177° C. 10 min | 177° C. 10 min |
| Treating conditions | Bisphenol AF (wt %) | 1.0 | 30 | 10 |
|  | BDPIC (wt %) | 0.2 | 5 | 2 |
|  | Solvent | acetone | acetone | acetone |
|  | Immersion temp. (°C.) | 20 | 20 | 20 |
|  | Immersion time (min) | 15 | 40 | 15 |
|  | Crosslinking reaction | 232° C. 24 hr | 232° C. 24 hr | 232° C. 24 hr |
| Physical properties | Hardness (JIS A) | 77 | 91 | 67 |
|  | Tensile strength (Kg/cm$^2$) | 175 | 120 | 130 |
|  | Elongation (%) | 220 | 140 | 240 |
|  | Surface stickiness (Kgf) | 4 | 0 | 5 |
| Ratio of the total crosslink density at the surface relative to the minimum total crosslink density |  | 1.5 | 17 | 9 |

Note:
[1]as defined in Table 1

TABLE 2

|  |  | Example | | Comparative Example | |
|---|---|---|---|---|---|
|  |  | 6 | 7 | 4 | 5 |
| Formulation (parts by weight) | Polymer B[1] | 100 | — | 100 | — |
|  | Polymer C[2] | — | 100 | — | 100 |
|  | MT Carbon Black | 30 | 30 | 30 | 30 |
|  | Ca(OH)$_2$ | 6 | 6 | 6 | 6 |
|  | MgO (high activity) | 3 | 3 | 3 | 3 |
|  | Bisphenol AF | 2 | 2 | 2 | 2 |
|  | BDPIC[3] | 0.3 | 0.3 | 0.3 | 0.4 |
|  | Dimethylsulfone | 2 | 2 | 2 | 2 |
| Vulcanizing reaction (°C. × min) |  | 177 × 10 | 177 × 10 | 177 × 10 | 177 × 10 |
| Treating conditions | Bisphenol AF (wt %) | 11 | 11 | — | — |
|  | BDPIC[3] (wt %) | 1.7 | 1.7 | — | — |
|  | Solvent | acetone | acetone | — | — |
|  | Immersion temp. (°C.) | 20 | 20 | — | — |
|  | Immersion time (min) | 15 | 15 | — | — |
|  | Crosslink reaction (°C. × hr) | 232 × 24 | 232 × 24 | 232 × 24 | 232 × 24 |
| Hardness (JIS A) |  | 82 | 84 | 78 | 78 |
| Tensile strength (Kg/cm$^2$) |  | 135 | 125 | 165 | 160 |
| Elongation (%) |  | 200 | 260 | 250 | 330 |
| Compression set (%) |  | 20 | 24 | 18 | 22 |
| Surface stickiness (Kgf) |  | 0.2 | 3.0 | 22 | 27 |

Note:
[1]consisting of vinylidene fluoride/hexafluoropropylene/tetrafluoroethylene (64/19/17 in molar ratio) and having an intrinsic viscosity index of 200 ml/g
[2]consisting of vinylidene fluoride/hexafluoropropylene/tetrafluoroethylene (59/23/18 in molar ratio) and having an intrinsic viscosity index of 140 ml/g
[3]Bis(benzyldiphenylphosphine)iminium chloride From the results of Examples 6 and 7 and Comparative Examples 4 and 5, it is apparent that even when the vinylidene fluoride content of the elastomer is low, i.e. even when the fluorine content of the elastomer is high, the surface non-stickiness properties of the shaped articles of the present invention are improved.

[2]Bis(benzyldiphenylphosphine)iminium chloride

As is apparent from the results of Example 8 in Table 3, even when the ratio of the total crosslink density at the surface relative to the minimum total crosslink density is 1.5, the surface non-tackiness properties are remarkably improved. Further, as is apparent from the results of Example 9 in Table 3, when a vulcanized elastomer sheet is treated with a high concentration treating solution for a prolonged period of time, there is obtained a sheet which is high in the above-mentioned crosslink density ratio and excellent in surface non-tackiness properties. Examples 11 to 14 and Comparative Examples 6 and 7.

Formulations indicated in Table 4 are each separately kneaded by a customary method using 6-inch mixing rolls, and subjected to heat press-molding for vulcanization under conditions indicated in Table 4, to thereby obtain six sheets each having a size of 90 mm×160 mm×2 mm.

Of the thus obtained sheets, each of the four sheets are separately immersed in each of treating solutions prepared by dissolving the crosslinking agents indicated in Table 4 in acetone/methanol (1/1: vol), at an immersion temperature of 20° C. for a period of time indicated in Table 4. The sheets are then taken out of the treating solutions and subjected to air-drying overnight, followed by further drying at 120° C. for 30 min.

Then, the sheets which are treated with the treating solutions are subjected to a crosslinking reaction under conditions indicated in Table 4, to thereby obtain surface-treated shaped articles of crosslinked fluoro-elastomers. Likewise, the sheets which are not treated with the treating solution are subjected to heat treatment under conditions indicated in Table 4 to obtain shaped articles. The physical properties of the shaped articles and the ratios of the total crosslink density at the surface relative to the minimum total crosslink density with respect to the shaped articles are shown in Table 4.

As is apparent from Table 4, the shaped articles obtained in Examples 11 to 14 are superior in surface non-stickiness properties to the shaped articles obtained in Comparative Examples 6 and 7.

EXAMPLES 15 and 16 and COMPARATIVE EXAMPLE 8

Vulcanized shaped articles are obtained in substantially the same manner as in Example 1 except that the formulations are changed to those as indicated in Table 5. Thereafter, the vulcanized shaped articles are subjected to surface treatment in substantially the same manner as in Example 1 except that the surface treatment conditions are changed to those as indicated in Table 5.

On the other hand, a vulcanized shaped article is directly subjected to heat treatment, without being treated with a treating solution (Comparative Example 8).

With respect to the thus obtained articles, surface stickiness are measured. Measurement of surface stickiness is conducted in substantially the same manner as in Example 1 except that the oven temperature is changed to 80° C. The results are shown in Table 5.

As is apparent from Table 5, the articles obtained in Examples 15 and 16 are excellent in surface non-stickiness properties as compared to the article obtained in Comparative Example 8.

TABLE 5

|  |  | Example | | Comparative Example |
|---|---|---|---|---|
|  |  | 15 | 16 | 8 |
| Formulation (parts by weight) | Polybutadiene[1] | 40 | 40 | 40 |
|  | Natural rubber[2] | 60 | 60 | 60 |
|  | N 330 carbon[3] | 62.5 | 62.5 | 62.5 |
|  | Aromatic oil[4] | 25 | 25 | 25 |
|  | Zinc flower No. 1[5] | 3 | 3 | 3 |
|  | Stearic acid | 2 | 2 | 2 |
|  | NOCRAC 810NA[6] | 1 | 1 | 1 |
|  | Sulfur | 1.75 | 1.75 | 1.75 |
|  | NOCCELER NS[7] | 1.25 | 1.25 | 1.25 |
| Vulcanizing reaction |  | 145° C. 15 min | 145° C. 15 min | 145° C. 15 min |
| Treating conditions | PERCUMYL D[8] (wt %) | 5 | 5 | — |
|  | TAIC[9] (wt %) | 10 | 10 | — |
|  | Solvent | hexane | hexane | — |
|  | Immersion temp. (°C.) | 20 | 20 | — |
|  | Immersion time (min) | 30 | 60 | — |
|  | Crosslinking reaction | 160° C. 90 min | 160° C. 90 min | 160° C. 90 min |

TABLE 4

|  |  | Example | | | | Comparative Example | |
|---|---|---|---|---|---|---|---|
|  |  | 11 | 12 | 13 | 14 | 6 | 7 |
| Formulation (parts by weight) | Viton E-60[1] | 100 | 100 | 100 |  | 100 | 100 |
|  | Polymer E[2] |  |  |  | 100 |  |  |
|  | MT Carbon Black | 30 | 30 | 20 | 30 | 20 | 30 |
|  | Ca(OH)$_2$ | 6 | 6 |  | 6 |  | 6 |
|  | MgO (low activity) |  |  | 15 |  | 15 |  |
|  | MgO (high activity) | 3 | 3 |  | 3 |  | 3 |
|  | Bisphenol AF | 2 | 2 |  | 2 |  | 2 |
|  | BDPIC | 0.3 | 0.3 |  | 0.3 |  | 0.3 |
|  | Diak No. 3[3] |  |  | 3 |  | 3 |  |
| Vulcanizing reaction (°C. × min) |  | 177 × 15 | 177 × 15 | 163 × 30 | 177 × 15 | 163 × 30 | 177 × 15 |
| Treating conditions | Diak No. 3[3] (wt %) |  | 12 | 12 |  | — | — |
|  | DCEDA[4] (wt %) |  |  |  | 12 | — | — |
|  | Solvents | acetone/ethanol = 1/1 | same as left | same as left | same as left | — | — |
|  | Immersion temp. (°C.) | 20 | 20 | 20 | 20 | — | — |
|  | Immersion time (min) | 15 | 30 | 90 | 15 | — | — |
|  | Crosslinking reaction (°C. × hr) | 163 × 1 and 200 × 24 | | | | 200 × 24 | 232 × 24 |
| Physical properties | Hardness (JIS A) | 78 | 80 | 76 | 80 | 74 | 77 |
|  | Tensile strength (Kg/cm$^2$) | 150 | 140 | 165 | 150 | 190 | 165 |
|  | Elongation (%) | 200 | 185 | 330 | 195 | 380 | 230 |
|  | Surface stickiness (kgf) | 0.5 | 0.1 | 0.1 | 0.4 | 31 | 29 |
| Ratio of the total crosslink density at the surface relative to the minimum total crosslink density |  | 4 | 7 | 18 | 5 |  |  |

[1] consisting of vinylidene fluoride/hexafluoropropylene (80/20 in molar ratio) (manufactured and sold by E. I. Du Pont De Nemours And Company, U.S.A.)
[2] consisting of vinylidene fluoride/hexafluoropropylene/tetrafluoroethylene (64.5/17.7/17.8) and having an intrinsic viscosity index of 90 ml/g
[3] N,N'-dicinnamylidene-1,6-hexanediamine (manufactured and sold by E. I. Du Pont De NEMOURS AND COMPANY, U.S.A.)
[4] N,N'-dicinnamylidene-1,2-ethanediamine

TABLE 6

|  |  | Example | | Comparative Example |
|---|---|---|---|---|
|  |  | 17 | 18 | 9 |
| Formulation (parts by weight) | Polybutadiene[1] | 40 | 40 | 40 |
|  | Natural rubber[2] | 60 | 60 | 60 |
|  | N 330 carbon[3] | 62.5 | 62.5 | 62.5 |
|  | Aromatic oil[4] | 25 | 25 | 25 |
|  | Zinc flower No. 1[5] | 3 | 3 | 3 |
|  | Stearic acid | 2 | 2 | 2 |
|  | NOCRAC 810NA[6] | 1 | 1 | 1 |
|  | Sulfur | 1.75 | 1.75 | 1.75 |
|  | NOCCELER NS[7] | 1.25 | 1.25 | 1.25 |
| Vulcanizing reaction (°C. × min) |  | 145 × 15 | 145 × 15 | 145 × 15 |
| Treating condition | Sulfur (wt %) | 5 | 5 | — |
|  | NOCCELER NS[7] | 3 | 3 | — |
|  | Solvent | carbon disulfide/acetone = 4/1 (vol.) | carbon disulfide/acetone = 4/1 (vol.) | — |
|  | Immersion temp. (°C.) | 20 | 20 | — |
|  | Immersion time (min) | 20 | 40 | — |
|  | Crosslinking reaction (°C. × min) | 145 × 20 | 145 × 20 | 145 × 20 |
| Physical properties | Hardness (JIS A) | 78 | 85 | 67 |
|  | Tensile strength (Kg/cm$^2$) | 180 | 160 | 210 |
|  | Elongation (%) | 380 | 320 | 510 |
|  | Surface stickiness (Kgf) | 10 | 7 | 25 |

Note:
[1] to [7] are as indicated in Table 5

|  |  | Example | | Comparative Example |
|---|---|---|---|---|
|  |  | 15 | 16 | 8 |
| Physical properties | Hardness (JIS A) | 75 | 80 | 67 |
|  | Tensile strength (Kg/cm$^2$) | 165 | 140 | 210 |
|  | Elongation (%) | 380 | 310 | 510 |
|  | Surface stickiness (Kgf) | 14 | 9 | 26 |

Note:
[1] DIENE 35R produced and sold by Asahi Kasei Kogyo K.K., Japan
[2] RSS No.3 according to International Natural Rubber Type Descriptions
[3] SEAST 3 produced and sold by TOKAI CARBON COMPANY LIMITED, Japan
[4] SONIC PROCESS OIL X-14 produced and sold by KYODO OIL COMPANY LIMITED, Japan
[5] Produced and sold by SAKAI CHEMICAL INDUSTRY COMPANY LIMITED, Japan
[6] Tradename of an antioxidant produced and sold by OUCHI SHINKO CHEMICAL INDUSTRIAL COMPANY LIMITED, Japan
[7] Tradename of a vulcanization accelerator produced and sold by OUCHI SHINKO CHEMICAL INDUSTRIAL COMPANY LIMITED, Japan
[8] Tradename of dicumyl peroxide produced and sold by NIPPON OIL & FATS CO., LTD., Japan
[9] triallyl isocyanurate

EXAMPLES 17 and 18 and COMPARATIVE EXAMPLE 9

Vulcanized shaped articles are obtained in substantially the same manner as in Example 1 except that the formulations are changed to those as indicated in Table 6. Thereafter, the shaped articles are subjected to surface treatment in substantially the same manner as in Example 1 except that the surface treatment conditions are changed to those as indicated in Table 6.

On the other hand, a vulcanized shaped article is directly subjected to heat treatment, without being treated with the treating solution (Comparative Example 9).

With respect to the thus obtained articles, surface stickiness is measured. Measurement of surface stickiness is conducted in substantially the same manner as in Example 1 except that the oven temperature is changed to 80° C. The results are shown in Table 6.

As is apparent from Table 6, the articles obtained in Examples 17 and 18 are excellent in surface non-stickiness properties as compared to the article obtained in Comparative Example 8.

What is claimed is:

1. A shaped article comprising a crosslinked elastomer, said shaped elastomer article being crosslinked with at least one first crosslinking agent at a substantially uniform first partial crosslink density throughout said shaped article and crosslinked with at least one second crosslinking agent at a second partial crosslink density continuously decreasing from each surface of the shaped article toward the interior of the shaped article, said first crosslinking agent being the same as or different from said second crosslinking agent, said second crosslinking agent being selected from the group consisting of an oxime crosslinking agent, a quinone crosslinking agent, a peroxide crosslinking agent, a polyhydroxy crosslinking agent, and a Schiff base-modified polyamine crosslinking agent containing 2 or 3 Schiff bases in the molecule, said first partial crosslink density cooperating with said second partial crosslink density to provide a total crosslink density continuously decreasing from each surface of the shaped article toward the interior of the shaped article, said total crosslink density reaching a minimum at a depth of greater than 5 μm from said surface, the ratio of the total crosslink density at said surface relative to the minimum total crosslink density being 1.5 to 25.

2. The shaped article according to claim 1, wherein the depth, at which the ratio of the total crosslink density to the minimum total crosslink density is 2, is not greater than 50 μm from the surface of the article.

3. A shaped article produced by blending an elastomer with at least one first crosslinking agent, molding the resultant blend to obtain a shaped intermediate article which is crosslinked with said first crosslinking agent, treating the surface of the resultant intermediate article with at least one second crosslinking agent, and effecting a crosslinking reaction with said second crosslinking agent to give the shaped article; the shaped article comprising a crosslinked elastomer; the shaped article being crosslinked with at least the first crosslinking agent at a substantially uniform first partial crosslink density throughout said shaped article and crosslinked with at least the second crosslinking agent at a second partial crosslink density continuously decreasing from each surface of the shaped article toward the interior of the shaped article; the first crosslinking agent being the same as or different from the second crosslinking agent and the second crosslinking agent being selected from the group consisting of an oxime crosslinking agent, a quinone crosslinking agent, a peroxide crosslinking agent, a polyhydroxy crosslinking agent, and a Schiff base-modified polyamine crosslinking agent containing 2 or 3 Schiff bases in the molecule; said first partial crosslink density cooperating with said second partial crosslink density to provide a total crosslink density continuously decreasing from each surface of the shaped article toward the interior of the shaped article; said total crosslink density reaching a minimum at a depth of greater than 5 μm from said surface; and the ratio of the total crosslink density at said surface relative to the minimum total crosslink density being 1.5 to 25.

4. The shaped article according to claim 1, wherein said elastomer is a fluorine-containing elastomer.

5. The shaped article according to claim 4, wherein said second crosslinking agent is a polyhydroxy crosslinking agent.

6. The shaped article according to claim 4, wherein said second crosslinking agent is a Schiff base-modified polyamine crosslinking agent containing 2 or 3 Schiff bases in the molecule.

7. The shaped article according to claim 6, wherein said Schiff base-modified crosslinking agent is N,N'-dicinnamylidene-1,6-hexanediamine.

* * * * *